Figure 1:
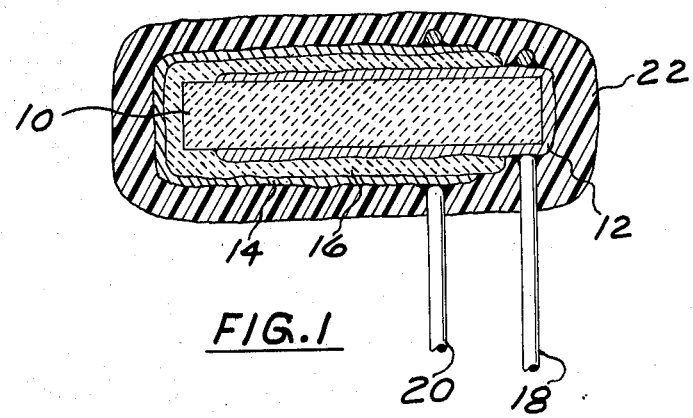

March 29, 1966  M. MARKARIAN ET AL  3,243,315
METHOD OF MAKING A CERAMIC CAPACITOR
Filed Jan. 4, 1955  2 Sheets-Sheet 1

MOUSHY MARKARIAN
AND
DAVID B. PECK
INVENTOR.

BY Connolly and Hutz

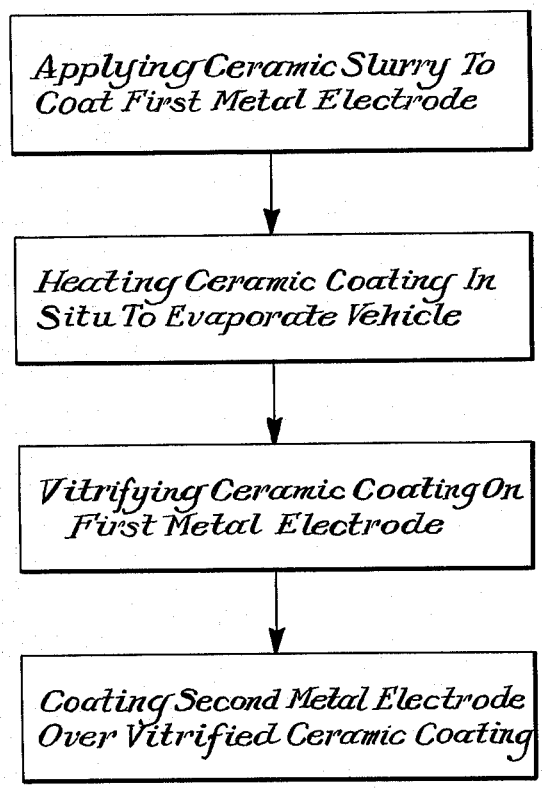

United States Patent Office 3,243,315
Patented Mar. 29, 1966

3,243,315
METHOD OF MAKING A CERAMIC CAPACITOR
Moushy Markarian and David B. Peck, Williamstown, Mass., assignors to Sprague Electric Company, North Adams, Mass., a corporation of Massachusetts
Filed Jan. 4, 1955, Ser. No. 479,832
8 Claims. (Cl. 117—217)

This invention relates to miniature ceramic capacitors, particularly to capacitors utilizing a ceramic dielectric of thickness less than self-supporting.

There has been noteworthy progress in the production of electrical capacitors of much increased capacitance per unit volume, as for example in the development of the metallized paper capacitor. There exists the need, however, for ceramic capacitors of much improved capacity per unit volume which can be accomplished only through using extremely thin films that are either non-self-supporting or susceptible to fracture. A series of patents issued in 1945, which, in their combined teachings, attempts to overcome this problem in the ceramic field by collectively teaching of building up stacks of alternating layers of vitreous enamel and electrodes and firing the entire stack on a temporary base, so that the stacked electrode becomes of a unitary nature and self-supporting through its many layers. Although this is an improvement over previously known systems, the dielectric constant of vitreous enamel is relatively small as compared to presently known ceramic materials. Virtually no increase in capacity per unit volume is available over presently known capacitor systems. Further indicative of the art is a recently issued Patent No. 2,684,522, which teaches imposing a thin high dielectric constant ceramic sheet on a thick metal electrode and then imposing on the opposite surface of the dielectric a fired conductive layer; the thick metal conductor serves to support the capacitive assembly. This latter construction, however, still suffers from relatively low capacity per unit volume, excessive production costs and critical conditions of production, as well as minor faults.

It is therefore an object of this invention to overcome the foregoing and related disadvantages of the prior art. It is a further object of this invention to produce a miniature ceramic capacitor of much improved electrical properties including capacitance per unit volume, power factor, and dielectric strength over any ceramic capacitor known in the art. A still further object of this invention is a process which yields quality production of these extremely small ceramic capacitors. Still further objects of this invention will be apparent from the following specification as well as the appended drawing.

In accordance with the objects of this invention there has been produced a miniature ceramic capacitor comprising a presintered ceramic base having disposed upon its surface a capacitive element consisting essentially of an initial conductive film of an oxidation resistant platinum metal coated with a thin ceramic film of high dielectric constant and a second electrode positioned upon said ceramic film, and terminal lead wire means extending from said electrodes through a protective coating disposed about said ceramic base and said capacitive element.

In a more restricted sense the objects of the above invention are achieved by the production of a miniature ceramic capacitor comprising a presintered ceramic rod having disposed on its surface a series of coatings consisting essentially of a first conductive film of an oxidation resistant platinum metal coated with a high dielectric constant ceramic film on which is positioned a second conducting film, said conductive films being margined in a fashion to allow termination of said electrodes, two lead wires extending from said first and second conductive films, each of said lead wires being wound about one of said margined areas of said electrodes and extending through a resinous casing which encloses said ceramic rod and said surface coatings.

The present invention is featured by the use of a presintered rod as the supporting member for disposition of the active capacitor elements. A further feature of this invention is the use of a platinum film as either or both conductive layers, which film is characterized by extreme resistance to oxidation and to diffusion into the base member during the step of firing the active dielectric layer.

The attainment of the objects of this invention may be better understood by reference to the following detailed description and to the appended drawing, in which:

FIG. 1 portrays in cross-sectional view an embodiment of the invention.

FIGS. 2, 3, 4, and 5 are a series of sectional views showing the stepwise production of an embodiment of the invention by the preferred novel process; and FIGURE 6 is a flow sheet of the process.

For a better understanding of this invention reference is made to FIGURES 1 and 6. In FIGURE 1 ceramic base member 10 is seen to have on its surface a series of layers. These layers constitute the active portion of the capacitor element with 12 and 14 indicating the inner and outer electrodes and with 16 indicating the thin high dielectric constant ceramic film. In the right side of the drawing there are two terminal wires 18 and 20 which extend from the inner electrode 12 and outer electrode 14, respectively. Fully encasing the ceramic base member and the active capacitor elements is a protective coating 22, usually a resin, although for high temperature operation it might be any of the well-known ceramic, enamel or clay insulating materials.

Referring to FIGURE 6 a first metallic capacitor electrode has applied thereto a slurry of ceramic material, the applied slurry is heated in situ on the electrode to evaporate the vehicle therefrom and the slurry is then vitrified, and a coating of metal is then applied over the vitrified ceramic to form a second electrode for the capacitor.

For optimum results, it is preferred to pre-fire the ceramic base member 10. Further, it is preferred to use a ceramic for base 10 whose dielectric constant is in excess of 90 and whose sintering temperature is at least 50° F. higher than that of the dielectric layer 16, as the resultant product is mechanically and electrically superior. It is particularly desirable to use high dielectric constant ceramics as the base, particularly the titanates, niobates and zirconates, for these materials do not readily permit diffusion of the electrode layer into the ceramic base member, and further do not effect a material change in the dielectric constant of the thin dielectric layer. In addition to these high dielectric constant titanates, zirconia and other extremely high firing temperature refractories can also be used as the base member. It is preferred, however, to use barium and/or calcium titanates which may have additives such as bismuth stannate; the various zirconates as barium, strontium and lead; niobates; tungstates, etc. Suitable ceramic compositions are taught in the Coffeen et al. United States Patent No. 2,658,833, issued November 10, 1953. While the preferred embodiment of this invention does not encompass the use of a green unfired ceramic base, that is unfired or unsintered, ceramic base as a support for the inner electrode and the thin dielectric film, it is possible to secure useful results with a green base, providing the sintering temperatures are substantially identical for the base and the dielectric layer. This is in contrast to the 50° F. minimum differential specified previously.

The two primary conditions that must be met by the inner electrode 12 are:

First, the inner electrode shall not oxidize to a non-conductive state during the relatively high sintering temperature for the thin ceramic dielectric film, which sintering for best results is carried out in an oxidizing atmosphere; and Second, the inner electrode coating must not evaporate into the surrounding atmosphere or diffuse extensively into the ceramic base member during this aforementioned dielectric sintering phase.

Certain of the platinum metals are not as susceptible to oxidation, evaporation or diffusion into the ceramic base member as the others and are extremely satisfactory for use with this invention. Such platinum type metals are rhodium, iridium, and platinum, the last being preferred because of its unusual resistance to oxidation during the firing cycle, its susceptibility to disoldering without further silvering finally its relative inexpensiveness as compared with rhodium and iridium. Palladium has been found to give inferior results, apparently because of its lower melting and boiling point, and marked susceptibility to oxidation during the firing of the thin ceramic dielectric film 16.

The resistivity of the inner electrode preferably should be no greater than 1 ohm per square for optimum power factors, however, units are suitable up to resistivities of 30 ohms per square. Thinner electrode films even with the preferred inner electrode metal, platinum, are undesirable owing to the presence of discontinuities in the film.

The thin ceramic dielectric layer which is the active dielectric element in this capacitor is of a composition quite similar to that which was discussed for the base member. This ceramic dielectric film should be of as high a dielectric constant as is permissible with considerations of temperature coefficient and dielectric strength taken into account. To be of a high dielectric constant ceramic for the purposes of this application, the dielectric constant should be at least 200 and up to 6000 or greater. The above-mentioned Coffeen et al. patent refers to suitable high dielectric constant ceramics with dielectric constants of from 200 to 1000 or more. With dielectrics of barium and calcium titanates admixed with minor amounts of the zirconates, less than 10%, it is possible to obtain dielectric constants of from 200 to greater than 6000. The thicknesses of these dielectric films which were employed with my invention, are from 0.0005 to .005 inch, depending upon the electrical application for which they are to be utilized. Two significant considerations are the maximum dielectric stress to which the component is to be exposed and the desired capacitance per unit volume, both of which then determine the optimum thickness to use.

These thin dielectric films can be imposed upon the ceramic base member having the adherent interelectrode film by numerous methods including electrophoresis, spraying, dipping and reaction coating. Reaction coating is carried out by spraying onto the hot ceramic base a carrier containing material that decomposes to give the desired dielectric composition, which may, of course, require high temperature sintering to develop optimum dielectric properties.

After the application of the ceramic film, the unit is subjected to the firing operation. With the dipping process of depositing the thin ceramic film upon the base member, it has been found that firing can be carried out over periods of from one minute to one hour with substantially comparable results. Such firing, for example, is carried out at temperatures of 2250° F. to 2600° F. to obtain optimum results for the particular dielectric coating which is being used. For example, if from 2 mol percent to 10 mol percent of bismuth stannate is being used in a composition of barium and calcium titanate as set forth in the Coffeen et al. patent, a firing temperature of about 2300° F. is used.

Now that the ceramic layer serving as the dielectric has been completely sintered it is necessary to impose upon its surface the outer electrode designated as 14 in FIG. 1. This electrode consists of a thin conductive film prepared in a manner well-known in the art. In the preferred embodiment silver particles dispered in a vehicle such as the type set forth in the Craven et al., United States Patent No. 2,694,016, is painted, dipped or sprayed, onto the surface of the dielectric and subjected to a firing cycle. The temperature of firing for silver is from 650° C. to 750° C. for a period of one to fifteen minutes. Although any of the noble metals such as gold, palladium, platinum, iridium, rhodium are satisfactory, it is preferred to use silver because of its lower cost and ready solderability. It has also been found that the stability of the silver during extending operation is exceptional. It must be pointed out, however, that caution must be observed to fire the silver within the prescribed temperature range and for the duration set forth above, for if the outer electrode is improperly fired, a substantial increase in the power factor is occasioned. After the silver conductor or the outer electrode 14 has been fired and the component brought back to room temperature the leads are very simply attached to the respective conductive layers. It is preferred to use tinned-copper wire which is wound about the respective electrodes and then extended out for a substantial distance so that the protective casing which is placed over the component will leave the terminal portions of the leads exposed. Once the leads have been wound about their respective electrodes, the entire assembly may be dipped into a solder bath and the leads secured in position. It has been found possible to use smaller than an AWG No. 20 wire for termination of the electrode.

For a particular modification of this invention where it is preferred to obtain controlled variations in capacity through controlled variation of firing conditions, one should use platinum rather than silver for the outer electrode. It has been found that substantially simultaneous firing of the dielectric layer and an outer electrode of platinum yields units wherein capacity is directly related to the firing conditions, particularly duration. It is necessary only to pre-fire the dielectric layer for a minute or less prior to imposition of the outer platinum electrode. This outer electrode, although preferably platinum, encompasses all the oxidation resistant patinum metals.

The unit is now in such form that the outer protective encasement can be imposed about it. It is preferred to use for this outer protective coating a phenolic resin which is subsequently wax-dipped so as to prevent moisture penetration. Alternatively, the encasing may be cast, molded, or otherwise formed and not limited to the phenolic but including all of the well-known insulating coatings such as silicone, urea formaldehyde, wax, polyester, etc., both filled or unfilled.

Falling within the scope of this invention is the process as well as the modification for producing the objects of the invention, a surprising feature of which is the quality of capacitors produced thereby.

Figure 2:
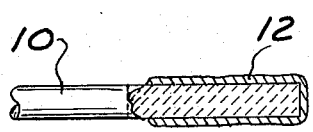

FIGS. 2, 3, 4, and 5 illustrate the various stages in the production of this miniature capacitor. The first step is shown in FIG. 2 wherein a fired base member 10, which in the preferred embodiment is a presintered ceramic rod, although this invention does not necessarily exclude tubes or various other configurations of base members, is provided with inner electrode 12. The rod initially of 2" length and approximately 28 mils in diameter, has a platinum resinate imposed upon its surface for a distance of from ¾" to 1" by dipping into the metallic resinate. Each of 10 to 15 dips into a solution of the platinum resinate, is followed by firing from 3 to 4 minutes at a temperature of from 500 to 550° C., to achieve the desired 0.00025 to 0.0005 inch thickness range of the inner electrode iridium or rhodium can be utilized as the inner electrode by using the corresponding resinates and firing after every dipping in a manner such as set forth above. Alloys of these metals may also be used with good results.

After the platinum coating has been imposed upon the presintered ceramic member, which member, for example, has a dielectric constant of from 90 to 6000, the rod is broken so as to leave an uncoated portion 24 from 1/64 to 1/32 of an inch wide. The thin ceramic dielectric layer 16 is obtained by dipping the rod prepared as above, in a ceramic slurry with the margined end downward so that the electrode is coated with the ceramic layer leaving only 1/32 to 1/4 of an inch of the platinum layer 12 exposed for subsequent connection of the terminal lead wire. For the dipping operation it is generally preferred that the slurry be of about 55% ceramic solids, for if substantially below that percentage poor coating results along with bubbles which subsequently rupture during the sintering operation. The solids range is from 55 to 70% by weight and for proper viscosity characteristics the slurry may be modified by adding a minor amount of a thickening agent such as carboxy methyl cellulose. The dip-coated ceramic dielectric can be exposed to sintering periods of from 1 to 60 minutes with satisfactory results, however, longer periods cause diffusion of the platinum inner electrode layer into the ceramic dielectric layer raising the power factor to an appreciable amount. Very suitable films ranging from 0.5 mil to 5.0 mils thickness have been obtained with the firing period of above at a temperature of about 2300° F. If desired to obtain satisfactory thickness of the dielectric so as to use it with optimum results in circuits requiring high dielectric strength, a second discrete coating of ceramic may be put on it in the fashion set forth above and similarly fired. The ceramic coating in finished form on the inner electrode is shown diagrammatically in cross-section in FIG. 3.

According to a limited embodiment of the invention, a special method is employed for producing the margin 24 for the inner electrode 12 so as to avoid the electrical weakness of the ceramic dielectric at the sharp edge of the base member. In this modified process the base member, prior to imposition of the inner electrode, is dipped in a polyvinyl alcohol solution to a depth of about 1/32 of an inch. After drying the polyvinyl alcohol film, the platinum or inner electrode metal resinate is applied to produce the conductive layer. The polyvinyl alcohol film which during the firing of the electrode is dissipated to permit any overlying electrode material to flake away leaving the exposed margin 24 of the base member. The ceramic coating can thereafter be applied as taught above, and electrical failures of the thin dielectric do not occur at the sharp edge (the end) of the base member. Such technique is satisfactory not only in this application but wherever it is desired to margin or to avoid imposing a conductive layer on a portion of a ceramic body, e.g. printed circuitry. Other resins as polystyrene, polyethylene, polyester, cellulose ethers and esters, etc. would be equally suitable. The use of this modified process makes possible a technique of handling further process steps in efficient manner. Once the inner electrode has been fired and the margin produced by flaking off the metal film, the base member is placed (unmetallized end down) into a pressed carrying rod composed of organic binder, aluminum oxide and clay. Any desired number of capacitor units can be so placed in the carrying rod. The units are thereafter simultaneously dipped to the required depth in the high dielectric constant slurry and fired. The composition of the carrying rod is given merely for illustration as it may be of any material which can withstand the sintering temperature of the ceramic dielectric. The important feature is that this carrying rod can be exposed to all processing conditions of the capacitor until the unit after it may be discarded, thus avoiding handling of the units by other mechanical means.

Figure 4:
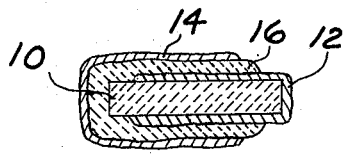

The next step, as is apparent from the FIG. 4, is the imposition of the outer electrode 14 upon the assembly by dipping of the assembly into a silver-containing solution as previously set forth.

Figure 3:
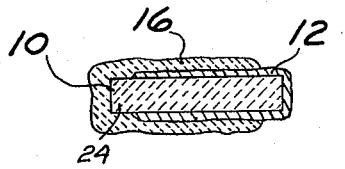
Figure 5:
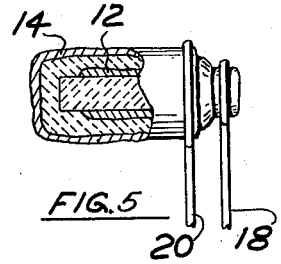

The unit of FIG. 3 is dipped into the silver solution with the exposed platinum electrode 12 upward, and is dipped to a level such that there is a margin of 1/64 to 1/32 of an inch of the ceramic layer 16 exposed, that is, the silver dip is approximately to 9/32 of an inch in depth. After removing from the silver dip, the unit is fired at a temperature of from 650° C. to 750° C. for five minutes. The tin-copper lead wires are then attached as shown in FIG. 5 and in the manner set forth above, with each of the lead wires serving to terminate one of the electrodes, that is, lead wire 18 terminates the inner conductor 12, while lead wire 20 terminates the outer electrode 14. The unit is then solder-dipped so as to affix the terminal lead wires, and thereafter protectively encased in some type of an electrically insulating body such as a phenolic resin with a subsequent wax impregnation for water proofing.

As a specific example of this invention, both the base member and the dielectric were produced from a barium-calcium titanate having 2 mol percent of bismuth stannate. The base member molded to a size one inch long and 0.028 inch in diameter was fired for one hour at 235° F. with a resulting dielectric constant of 700. The platinum inner electrode was produced by 10 coatings of the platinum resinate, each followed by a three-hour firing at 525° C. A dielectric film of 0.9 mil thickness of dielectric constant of 700 was obtained by a single dip in a 55% solids by weight water slurry of the above barium calcium titanate, modified by bismuth stannate followed by firing at 2350° F. for 1 minute. A silver electrode obtained by coating with silver particles followed by firing at 700° C. for 5 minutes resulted in a capacitor of 1231 mmfd. For this unit margins of 1/32 of an inch were used. For a comparable unit having a 0.0035 inch thick dielectric a capacity of 386 mmfd. was obtained. The maximum dielectric stress for the 0.9 mil thick dielectric is about 250 volts, whereas for the 3.5 mil thick unit up to 500 volts can be imposed without breakdown. With the preferred double dipping of a rod identical as that above to produce a dielectric of 0.0029 inch total thickness, each dipping followed by firing for one hour at 2350° F., breakdown strengths of 500 volts were achieved with capacitance values up to 3800 mmfd. With both the one-minute and sixty-minute firings comparable power factors of 0.75% to 2.5% are found.

A further modification of the process previously mentioned allows process control of final capacity by firing duration. It has been found that the outer electrode can be fired simultaneously with the dielectric to effect a stable capacitor susceptible to controlled capacity values. The initial phases of the process are identical, namely, production of the base member and formation of the inner electrode. Then the dielectric layer is imposed on the electrode by any of the procedures and thereafter presintered for a period up to one minute at a temperature of from 2250° F. to 2600° F. Coatings of dielectric are added until the desired thickness is obtained. The outer electrode must be of an oxidation resistant platinum metal, preferably platinum, that is easily applied as a resinate and subsequently fired. The unit is thereafter fired for a period necessary to develop the capacity required, for example: a double-dip coated unit with each dip presintered for one minute at 2350° F. having a platinum inner and outer electrode, the dip-coated dielectric layer of a composition which has a dielectric constant of 6000 in the fully sintered state yields after:

| Total firing time at 2350° F.: | Capacity mmfd. |
| --- | --- |
| 2 minutes (merely 2–1 min. presinterings) | 1200 |
| 15 minutes | 3000 |
| 30 minutes | 7000 |
| 60 minutes | 11000 |

This technique of firing the outer electrode and the presintered dielectric layer simultaneously makes possible fabrication of multilayer ceramics of further enhanced capacitance per unit volume values. After the drying of the outer platinum electrode the simultaneous firing need not be conducted until numerous alternate layers of pre-sintered dielectric and dried electrode is built up, and then all simultaneously fired. Of course, it is understood that appropriate margining of the electrodes and dielectric is made to allow termination of the active electrodes in a substantial non-inductive manner.

According to another embodiment of the invention, the inner electrode can be eliminated through modification of the composition of the ceramic base member. By use of a conducting ceramic core material, e.g. iron titanate or alternatively a high dielectric ceramic loaded with metal, e.g. diffused throughout barium titanate, the base member combines the function of support and capacitor electrode into a single physical element. For very high dielectric constant dielectric films one must determine that the dual function body will not react under firing conditions to lower the dielectric contant of the dielectric layer.

A further embodiment of the invention can be produced by application of parallel spiral electrodes on high dielectric constant rods so as to realize a large continuous edge-effect type of capacity. The electrodes would be spiralled as low resistance paths in screw thread fashion about the high dielectric constant ceramic rod. The gap between adjacent electrodes is fifty mils or less, with a preferred separation of ten mils or less, with a supporting member having a dielectric constant greater than 500. Surprisingly higher capacities per unit volume are obtained with the preferred structure. The lead wires would be axial terminated in a wide band of the respective electrode at each end of the supporting member. This embodiment could further is modified by imposing on the dual electrodes a covercoat of high dielectric constant material as a titanate or alternatively, vitreous enamel. Increased capacitance per unit volume would result from the covercoat depending upon its dielectric constant. For the ceramic covercoat noble metal and preferably oxidation resistant platinum metals would be used.

As indicated above the base member 10 can be solid or hollow. Thus a tube substantially twice the capacity can be realized for then the inner electrode 12 can extend onto the internal surface of the tube as well as the exterior as in FIG. 1. Of course, it is apparent that the dielectric layer 16 and outer electrode 14 are imposed in sequence over the extended inner electrode to form the capacitor structure with twice the capacitance.

In a still further embodiment of this invention the use of a ceramic base member can be avoided by utilizing a platinum wire or tube as a self-supporting inner electrode for the capacitor. The dielectric layer is then imposed on in the fashion previously set forth. Alternatively, surface oxidized titanium wire can be used as the inner electrode. The unusual feature of this latter embodiment is that the dielectric layer can be produced by reaction with barium carbonate, to form barium titanate.

It is clearly apparent from the results obtained by following the practice of the invention and achieving the objects of this invention, capacity efficiencies and capacity per unit volume are achieved at levels hitherto unknown. The units further have excellent long life stability and can withstand exceptional voltage stress.

As many apparently widely different embodiments of this invention may be made without departing from the spirit and scope hereof, it is to be understood that the invention is not limited to the specific embodiments hereof except as defined in the appended claims.

What is claimed is:

1. The method of making an electric capacitor which comprises providing a slurry consisting of ceramic material having a dielectric constant of greater than 200, in a vehicle which can be evaporated without leaving a residue, providing a metallic capacitor electrode capable of supporting said slurry and which is nonoxidizable in air at temperatures up to and including the temperature at which said ceramic material vitrifies, applying a coating of said slurry to said electrode, heating said coating in situ to evaporate said vehicle therefrom, vitrifying the ceramic material of said coating on said electrode, and applying a coating of metal over the vitrified ceramic material on said electrode to form a second electrode for the capacitor.

2. The method of making a capacitor which comprises providing a slurry consisting of powdered ceramic material having a dielectric constant of greater than 200, in a vehicle which can be evaporated without leaving a residue, providing a metallic capacitor electrode capable of supporting said slurry and which is nonoxidizable in air at temperatures up to and including the temperature at which said ceramic material vitrifies, dipping said electrode into said slurry to apply a coating of said slurry on said electrode, evaporating said vehicle from said coating on said electrode, heating said coating on said electrode to vitrify the ceramic material of said coating on said electrode, and applying a coating of metal over the virtified ceramic material on said electrode to form a second electrode for the capacitor.

3. The method of making an electric capacitor which comprises providing a slurry of water and powdered ceramic material having a dielectric constant of greater than 200, providing a capacitor electrode capable of supporting said slurry and essentially consisting of a metallic element selected from the platinum metals and being non-oxidizing in air at temperatures up to and including the temperature at which said ceramic material vitrifies, painting a coating of said slurry on said electrode, evaporating the water from said coating on said electrode, heating said coating on said electrode to vitrify the ceramic material of said coating on said electrode, and applying a metal layer over the vitrified ceramic material on said electrode to form a second electrode for the capacitor.

4. The method of making an electric capacitor which comprises providing a slurry of water and powdered ceramic material having a dielectric constant of greater than 200, providing a capacitor electrode capable of supporting said slurry and essentially consisting of a metallic element selected from the platinum metals and being nonoxidizable in air at temperatures up to and including the temperature at which said ceramic material vitrifies, painting a coating of said slurry on said electrode, evaporating the water from said coating on said electrode, heating said coating on said electrode to vitrify the ceramic material of said coating on said electrode, and applying a metal layer over the vitrified ceramic material on said electrode to form a second electrode for the capacitor .

5. The method of making an electric capacitor which comprises providing a fine particle slurry consisting of ceramic material having a dielectric constant of greater than 200, in a vehicle which can be evaporated without leaving a residue, providing a metallic capacitor electrode comprising a metallic element selected from the platinum metals, which electrode is capable of supporting said slurry and nonoxidizable in air at temperatures up to and including the temperature at which said ceramic material vitrifies, applying a coating of said slurry on said electrode, evaporating said vehicle from said coating on said electrode, heating said coating on said electrode to vitrify the ceramic material of said coating on said electrode, and coating a metal layer over the vitrified ceramic material on said electrode to form a second electrode for the capacitor.

6. The method of making an electric capacitor which comprises providing a slurry consisting of water and powdered ceramic material having a dielectric constant of greater than 200, providing a capacitor electrode capable of supporting said slurry and essentially consisting of a metallic element selected from the platinum metals and being nonoxidizable in air at temperatures up to and including the temperature at which said ceramic material vitrifies, applying a coating of said slurry on said electrode, heating said coating in situ to evaporate the water therefrom and to vitrify the ceramic material of said coating on said electrode, and applying a metal layer over the vitrified ceramic material on said electrode to form a second electrode for the capacitor.

7. The method of making an electric capacitor which comprises providing a slurry consisting of water and powdered ceramic material having a dielectric constant of greater than 200, providing a capacitor electrode capable of supporting said slurry and essentially consisting of a metallic element selected from the platinum metals and being nonoxidizable in air at temperatures up to and including the temperature at which said ceramic material vitrifies, spraying a coating of said slurry onto said electrode, heating said coating in situ to evaporate the water therefrom and to vitrify the ceramic material of said coating on said electrode, and coating a metal layer over the vitrified ceramic material on said electrode to form a second electrode for the capacitor.

8. The method of making an electric capacitor which comprises providing a slurry consisting of water and powdered ceramic material having a dielectric constant of greater than 200, providing a capacitor electrode capable of supporting said slurry and essentially consisting of a metallic element selected from the platinum metals and being nonoxidizable in air at temperatures up to and including the temperature at which said ceramic material vitrifies, dipping said electrode into said slurry to apply a coating of said slurry on said electrode, evaporating the water from said coating on said electrode, heating said coating on said electrode to vitrify the ceramic material of said coating on said electrode, and applying a metal layer over the vitrified ceramic material on said electrode to form a second electrode for the capacitor.

References Cited by the Examiner

UNITED STATES PATENTS

| | | | |
|---|---|---|---|
| 2,253,026 | 8/1941 | Godsey | 317—242 |
| 2,398,176 | 4/1946 | Deyrup | 29—25.42 |
| 2,531,389 | 11/1950 | Brandt | 29—25.42 |
| 2,585,752 | 2/1952 | Dorst | 317—242 X |
| 2,673,972 | 3/1954 | Minnium | 29—25.42 X |
| 2,706,798 | 4/1955 | Kodama | 317—242 |
| 2,728,036 | 12/1955 | Steiner et al. | 317—242 |
| 2,759,854 | 8/1956 | Kilby | 117—70 X |
| 2,769,944 | 11/1956 | Stein et al. | 317—242 |

ROBERT K. SCHAFER, *Primary Examiner.*

SAMUEL BERNSTEIN, RICHARD D. NEVIUS, JOSEPH REBOLD, JOHN H. MACK, *Examiners.*

E. E. NORRIS, W. L. JARVIS, A. C. MARMOR, M. TILLMAN, *Assistant Examiners.*